US011843179B2

(12) United States Patent
Hsu et al.

(10) Patent No.: US 11,843,179 B2
(45) Date of Patent: Dec. 12, 2023

(54) ELECTRONIC DEVICE

(71) Applicant: ASUSTeK COMPUTER INC., Taipei (TW)

(72) Inventors: Chien-Ming Hsu, Taipei (TW); Kuo-Chu Liao, Taipei (TW); Wei-Cheng Lo, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 0 days.

(21) Appl. No.: 17/698,092

(22) Filed: Mar. 18, 2022

(65) Prior Publication Data
US 2022/0320726 A1 Oct. 6, 2022

(30) Foreign Application Priority Data

Mar. 30, 2021 (TW) ................... 110111620

(51) Int. Cl.
H01Q 3/24 (2006.01)
H04B 1/44 (2006.01)
H04B 1/401 (2015.01)
H01Q 1/52 (2006.01)

(52) U.S. Cl.
CPC .............. *H01Q 3/24* (2013.01); *H01Q 1/521* (2013.01); *H04B 1/44* (2013.01); *H04B 1/401* (2013.01)

(58) Field of Classification Search
CPC .......... H01Q 1/24; H01Q 1/241; H01Q 1/243; H01Q 3/24; H04B 1/401; H04B 1/44; H04B 7/02; H04B 7/04; H04B 7/06; H04B 7/0602; H04B 7/0691; H04B 7/0802; H04B 7/0814

See application file for complete search history.

(56) References Cited

U.S. PATENT DOCUMENTS

| 9,895,606 | B1* | 2/2018 | Kamata | A63F 13/211 |
| 9,906,260 | B2* | 2/2018 | Ramachandran | H04B 1/44 |
| 2008/0143611 | A1* | 6/2008 | Wang | H01Q 1/243 |
| | | | | 343/702 |
| 2009/0295648 | A1* | 12/2009 | Dorsey | H01Q 21/28 |
| | | | | 343/702 |
| 2012/0315851 | A1* | 12/2012 | Park | H04B 7/0814 |
| | | | | 455/575.7 |
| 2013/0169507 | A1* | 7/2013 | Ko | H01Q 1/243 |
| | | | | 343/876 |
| 2013/0273856 | A1* | 10/2013 | Park | H04B 7/0602 |
| | | | | 455/73 |
| 2015/0188220 | A1* | 7/2015 | Liou | H01Q 3/24 |
| | | | | 342/385 |

(Continued)

FOREIGN PATENT DOCUMENTS

| CN | 103779669 A | 5/2014 |
| CN | 107734614 A | 2/2018 |

(Continued)

*Primary Examiner* — Jason Crawford
(74) *Attorney, Agent, or Firm* — McClure, Qualey & Rodack, LLP

(57) ABSTRACT

An electronic device is provided. The electronic device includes a plurality of main device antennas, a switch, and a processor. The switch enables at least one of the main device antennas. The processor is electrically connected to the switch and controls the switch to switch the enabled main device antenna based on a usage status of the electronic device.

8 Claims, 8 Drawing Sheets

(56) References Cited

U.S. PATENT DOCUMENTS

| | | | |
|---|---|---|---|
| 2015/0280773 A1* | 10/2015 | Chang | H04B 1/44 455/78 |
| 2016/0087343 A1 | 3/2016 | Chang et al. | |
| 2016/0141753 A1 | 5/2016 | Liou et al. | |
| 2017/0118323 A1* | 4/2017 | Kim | H04M 1/72412 |
| 2017/0187412 A1* | 6/2017 | Han | H04B 1/40 |
| 2017/0195004 A1* | 7/2017 | Cheng | H04B 7/0602 |
| 2017/0373712 A1* | 12/2017 | Kim | H04B 7/0834 |
| 2018/0048054 A1* | 2/2018 | Song | H01Q 1/245 |
| 2018/0316379 A1* | 11/2018 | Chang | H01Q 1/245 |
| 2018/0359017 A1* | 12/2018 | Kwon | H04B 7/0874 |
| 2020/0259539 A1* | 8/2020 | Lai | H04W 52/0245 |
| 2020/0280354 A1* | 9/2020 | Kulkarni | H04B 7/0602 |
| 2020/0358164 A1* | 11/2020 | Liao | H01Q 21/28 |
| 2021/0175752 A1* | 6/2021 | Johnston | H02J 50/23 |
| 2022/0190870 A1* | 6/2022 | Liu | H04B 1/401 |
| 2022/0263227 A1* | 8/2022 | Feng | H04B 7/0602 |
| 2022/0320726 A1* | 10/2022 | Hsu | H01Q 1/521 |

FOREIGN PATENT DOCUMENTS

| | | |
|---|---|---|
| CN | 108494459 A | 9/2018 |
| CN | 109088965 A | 12/2018 |
| TW | I549356 B | 9/2016 |
| TW | I594499 B | 8/2017 |

\* cited by examiner

ELECTRONIC DEVICE

CROSS-REFERENCE TO RELATED APPLICATION

This application claims the priority benefit of Taiwan application serial No. 110111620, filed on Mar. 30, 2021. The entirety of the above-mentioned patent application is hereby incorporated by reference herein and made a part of the specification.

BACKGROUND OF THE INVENTION

Field of the Invention

The disclosure relates to an electronic device.

Description of the Related Art

A plurality of wireless communication systems is integrated in an existing communication device due to system support requirements, while the design of an ultra-narrow frame screen and a full-screen ratio is the mainstream of current industrial design. As a result, it is an inevitably great challenge to optimize antennas of the systems in a limited space of the communication device.

In addition, different usage scenarios and accessories for the communication device affect the antenna performance differently. Therefore, it is necessary to use all antennas of the communication device more effectively.

BRIEF SUMMARY OF THE INVENTION

According to an aspect, an electronic device is provided. The electronic device includes a plurality of antennas, a switch, and a processor. The processor is electrically connected to the switch and configured to perform the following operation: controlling the switch to switch an enabled main device antenna based on a usage status of the electronic device.

A person of ordinary skill in the art may understand other objectives, technical means, and implementation aspects of the invention after referring to the drawings and the following described embodiments.

DETAILED DESCRIPTION OF THE EMBODIMENTS

Figure 1:
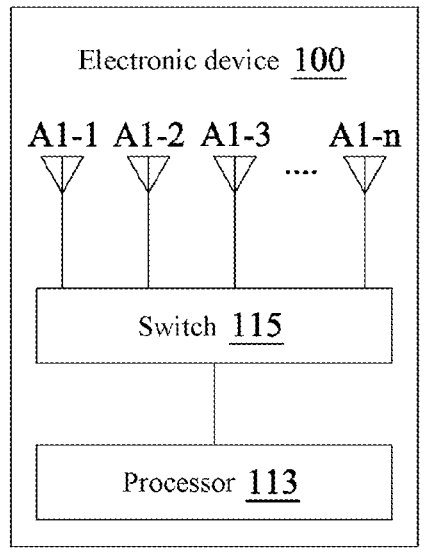
FIG. 1 is a schematic diagram of an electronic device according to the invention.

The following embodiments are used to illustrate technical content of the invention, and are not intended to limit the scope of the invention. It is to be noted that, components irrelevant to the invention are omitted and not shown in the following embodiments and drawings. Dimensional relationships between the components in the drawings are merely used for convenience of understanding, and are not intended to limit actual scales.

Referring to FIG. 1, an electronic device 100 includes n main device antennas A1-1, A1-2, and A1-3 to A1-$n$, a switch 115, and a processor 113. The switch 115 enables at least one of the main device antennas A1-1, A1-2, and A1-3 to A1-$n$. The processor 113 is electrically connected to the switch 115 and controls the switch 115 to switch the enabled main device antenna based on a usage status of the electronic device 100.

In an embodiment, when determining that the usage status of the electronic device 100 has been changed, the processor 113 controls the switch 115 to disable at least one main device antenna (in an embodiment, A1-2) of the main device antennas A1-1, A1-2, and A1-3 to A1-$n$ and enable at least another main device antenna (in an embodiment, A1-1) of the main device antennas. A signal strength of the enabled main device antenna is greater than a signal strength of the disabled main device antenna.

In an embodiment, the electronic device 100 is a smartphone, a tablet computer, or the like. In an embodiment, the main device antennas A1-1, A1-2, and A1-3 to A1-$n$ are omnidirectional antennas or directional antennas.

Figure 2:
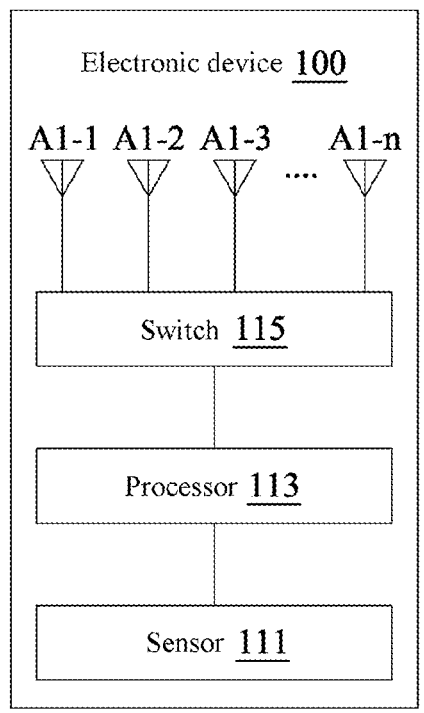
FIG. 2 is a schematic diagram of an electronic device according to the invention.

Referring to FIG. 2, the electronic device 100 further includes a sensor 111 electrically connected to the processor 113. In an embodiment, the sensor 111 is an optical sensor, an electronic compass, a pressure sensor, a capacitive sensor, or a motion sensor, and is configured to sense the usage status of the electronic device 100, generate a sensing signal, and transmit the sensing signal to the processor 113. The processor 113 determines the usage status of the electronic device 100 according to the sensing signal received from the sensor 111. In an embodiment, the electronic device 100 is in a portrait mode or a landscape mode.

Figure 3:
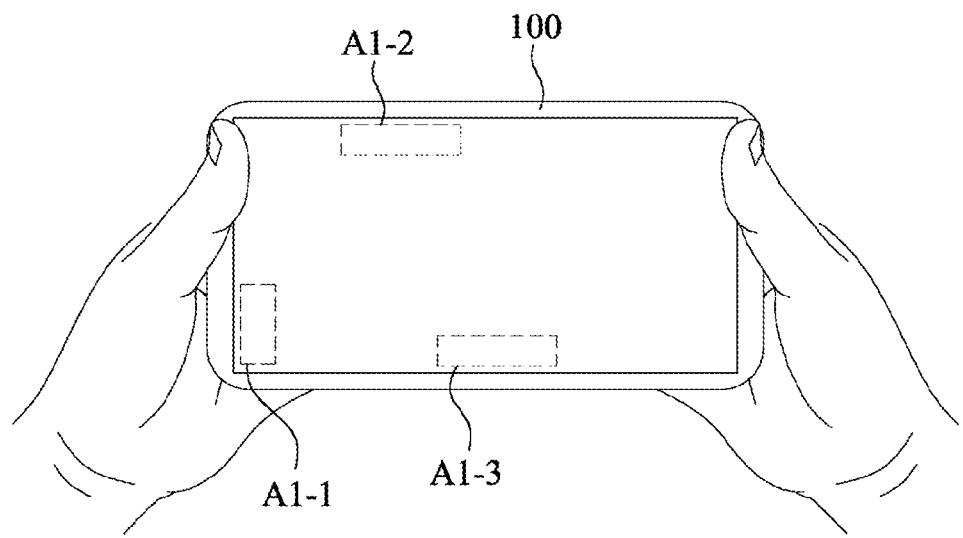
FIG. 3 shows an implementation scenario of an electronic device according to the invention.
Figure 4:
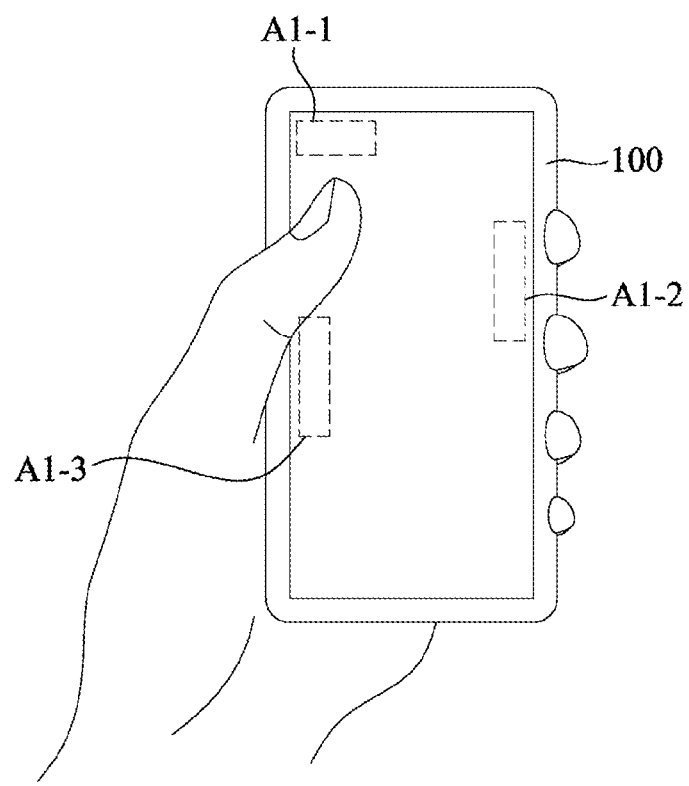
FIG. 4 shows an implementation scenario of an electronic device according to the invention.

Referring to FIG. 3 and FIG. 4, in an embodiment, when the electronic device 100 is in the landscape mode, the switch 115 enables the main device antenna A1-2. When the usage status of the electronic device 100 is changed from the landscape mode to the portrait mode, a part of signals transmitted or received by the main device antenna A1-2 are shielded by hands of a user. Therefore, the processor 113 controls the switch 115 to disable the main device antenna A1-2 and enable the main device antenna A1-1.

In an embodiment, the processor 113 is an application processor or a communication processor. The processor 113 further runs an operating system. In an embodiment, when an application program of the operating system is executed, the processor 113 determines that the usage status of the electronic device 100 has been changed and then controls the switch 115 to switch the enabled main device antenna.

In an embodiment, the application program is executed to perform the following operations: enabling a camera lens, sharing a hotspot, enabling a sound receiver, and enabling or disabling various communication systems.

Figure 5:
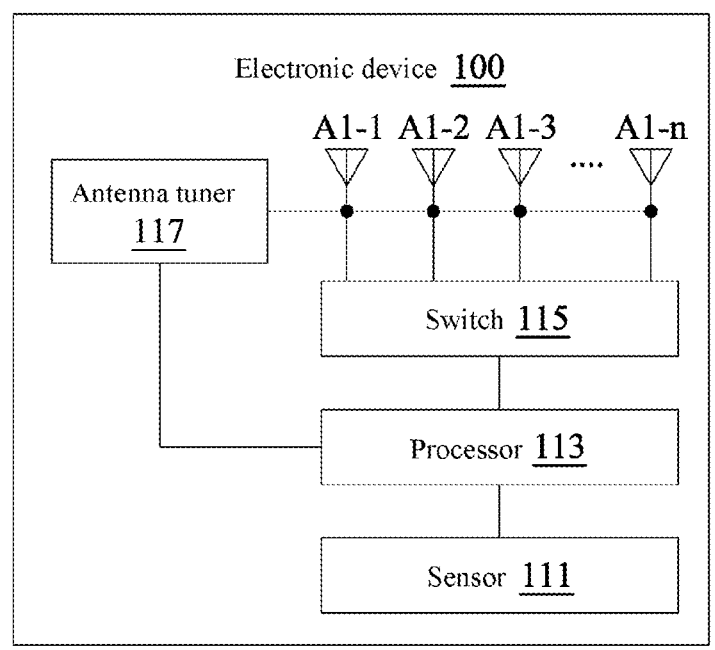
FIG. 5 shows a schematic diagram of an electronic device according to the invention.

Referring to FIG. 5, the electronic device 100 further includes an antenna tuner 117. The antenna tuner 117 is electrically connected to the main device antennas A1-1, A1-2, and A1-3 to A1-n and the processor 113. The processor 113 further controls the antenna tuner 117 to adjust an operating frequency band of at least one disabled antenna (in an embodiment, the main device antenna A1-2) of the main device antennas A1-1, A1-2, and A1-3 to A1-n; adjust similar frequency bands that are not used in the main device antennas to be isolated away from each other, to avoid mutual interference between used frequency bands of adjacent main device antennas caused by excessively close positions; and further reduce a Hall effect between the main device antennas and improve isolation between the antennas, or adjust an operating frequency band of the enabled main device antenna (in an embodiment, the main device antenna A1-1) of the antennas to optimize efficiency of the antenna with such a frequency band.

In an embodiment, the electronic device 100 further includes a memory. The processor 113 is electrically connected to the memory. The memory stores enable data. Signal strengths of main device antennas at different positions are affected by usage scenarios of the electronic device 100, or application programs during execution, and communication systems that are enabled, and the electronic device 100 also has a plurality of usage statuses. Therefore, the enable data is created in advance by using calibration mechanisms such as experiments, simulation analysis, and data comparison.

Main device antennas with better signal strengths used by the electronic device 100 in different usage statuses and a priority sequence of the usage statuses are recorded in the enable data. Therefore, when the usage status has been changed, the processor 113 controls the switch 115 to enable at least one of the main device antennas A1-1, A1-2, and A1-3 to A1-n based on a current usage status of the electronic device 100 and the enable data, to switch from the currently used main device antenna to a main device antenna corresponding to a changed usage status; or when the electronic device 100 is simultaneously in a plurality of usage statuses, the processor switches the main device antennas according to the priority sequence of the usage statuses. In an embodiment, the enable data is an enable comparison table.

In an embodiment, an accessory device 200 including at least one accessory antenna is further mounted on the electronic device 100, and the accessory device 200 is electrically connected to the electronic device 100 to provide additional functions for the electronic device 100. In an embodiment, the accessory device 200 is a base, an aerodynamic fan, or a game controller.

Figure 6:
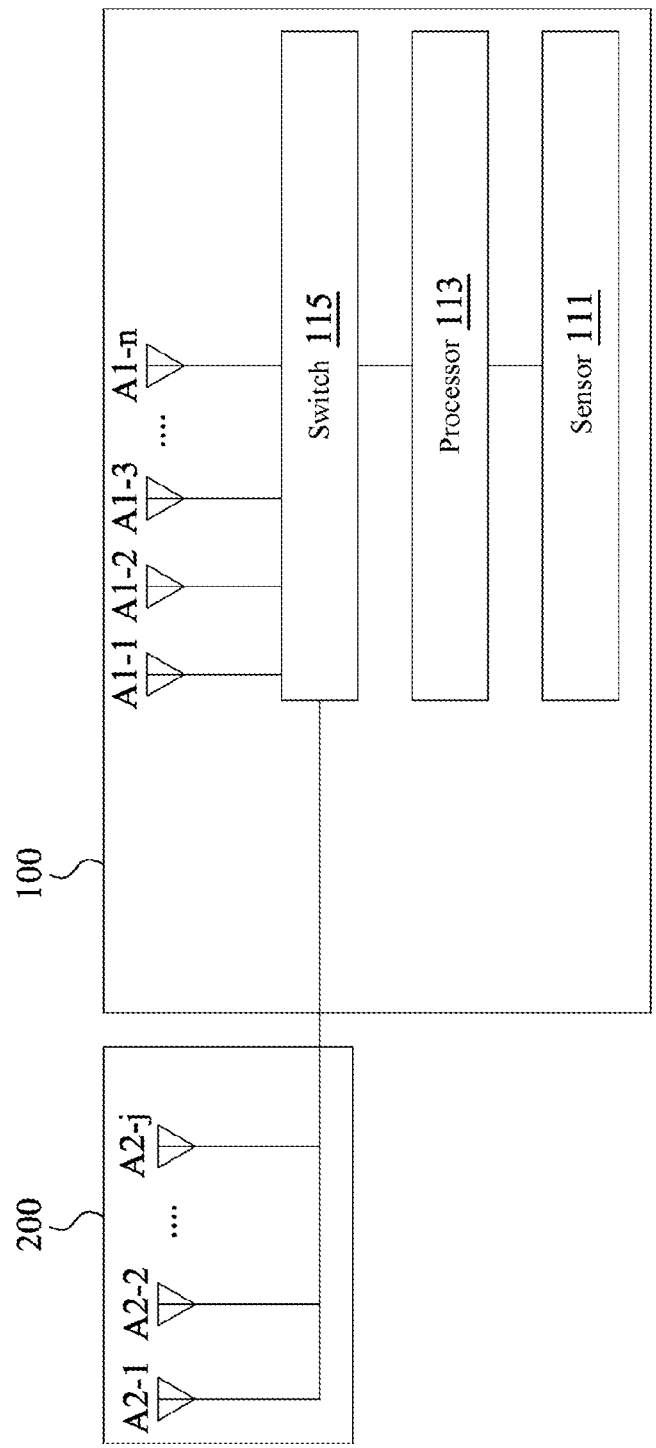
FIG. 6 shows a schematic diagram of an electronic device and an accessory device according to the invention.

Referring to FIG. 6. the accessory device 200 includes j accessory antennas A2-1, and A2-2 to A2-j. The accessory antennas are omnidirectional antennas or directional antennas. The switch 115 further enables at least one of the accessory antennas A2-1, and A2-2 to A2-j. The processor 113 controls, based on the usage status of the electronic device 100, the switch 115 to switch from enabling the main device antenna of the electronic device 100 to enabling at least one accessory antenna (in an embodiment, the accessory antenna A2-2) of the accessory antennas A2-1, and A2-2 to A2-j.

Figure 7:
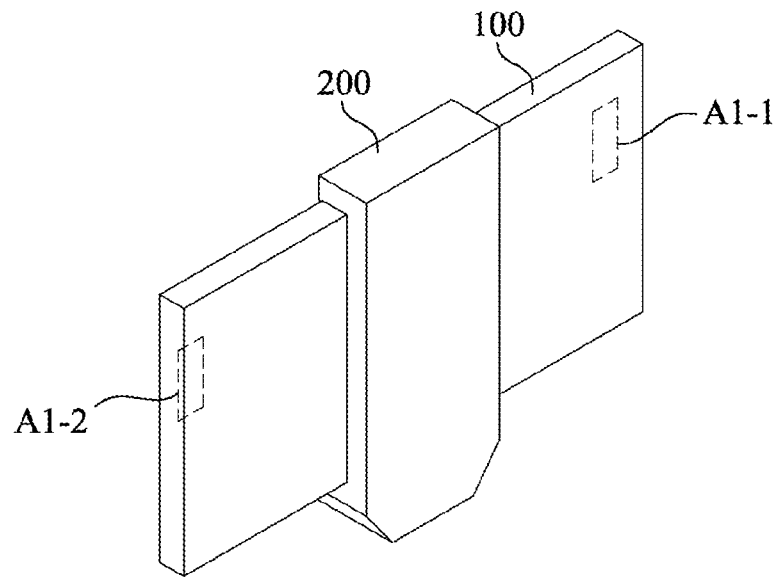
FIG. 7 shows an implementation scenario between an electronic device and an accessory device according to the invention.
Figure 8:
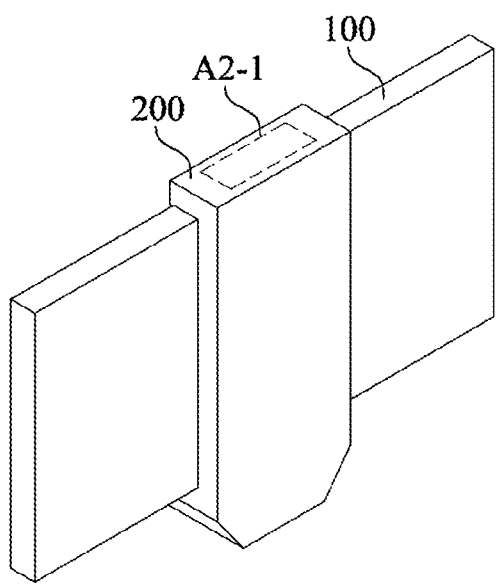
FIG. 8 shows an implementation scenario between an electronic device and an accessory device according to the invention.

Referring to FIG. 7 and FIG. 8, in an embodiment, the electronic device 100 is a mobile phone, and the accessory device 200 is an aerodynamic fan. Before the aerodynamic fan is mounted on the mobile phone, the switch 115 enables the main device antennas A1-1 and A1-2. When the aerodynamic fan is mounted, signal strengths of the main device antennas A1-1 and A1-2 are affected by holding the mobile phone in the landscape mode by the user. Therefore, when the processor 113 determines that the usage status is changed to that the accessory device 200 is mounted on the electronic device 100 (that is, the aerodynamic fan is mounted on the mobile phone), the processor 113 controls the switch 115 to disable the main device antennas A1-1 and A1-2 of the electronic device 100 and enable the accessory antenna A2-1.

Figure 9:
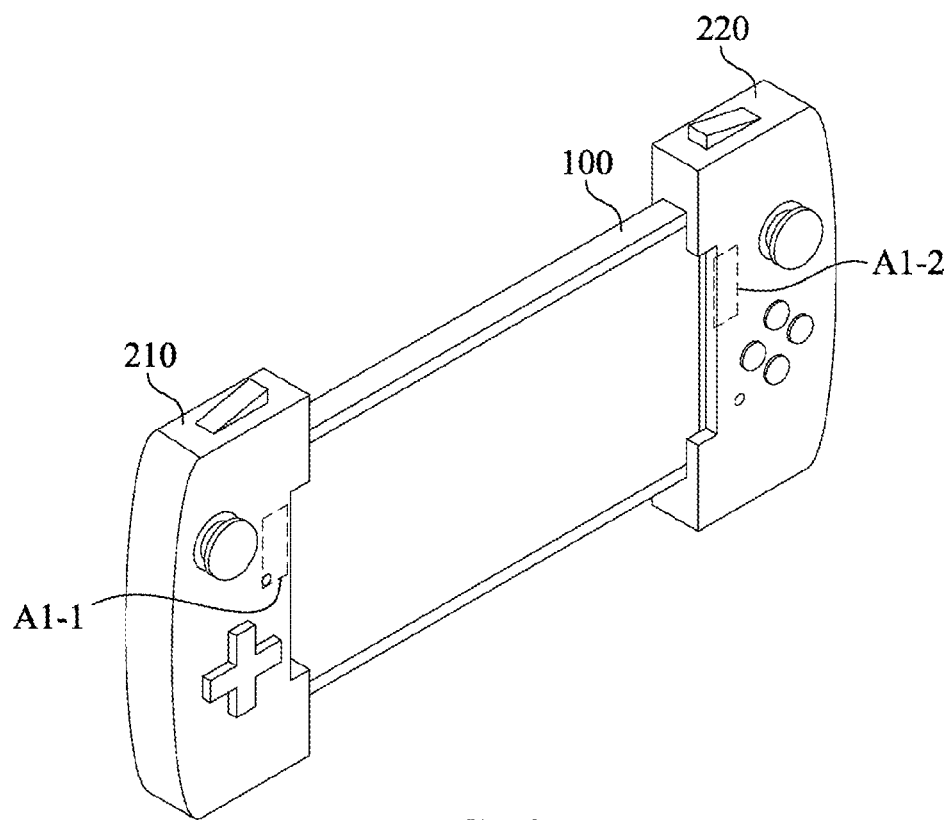
FIG. 9 shows an implementation scenario between an electronic device and an accessory device according to the invention.
Figure 10:
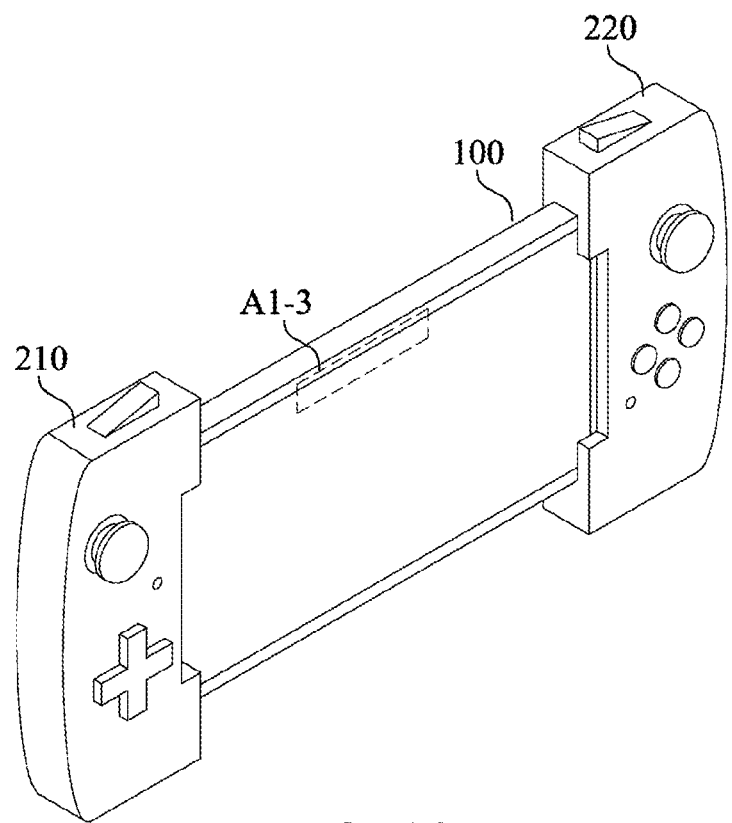
FIG. 10 shows an implementation scenario between an electronic device and an accessory device according to the invention.

Referring to FIG. 9 and FIG. 10, in an embodiment, the electronic device 100 is a mobile phone, and accessory devices 210 and 220 are game controllers. Before the game controllers are mounted on the mobile phone, the switch 115 enables the main device antennas A1-1 and A1-2. When the game controllers are mounted on the mobile phone, signal strengths of the main device antennas A1-1 and A1-2 are affected by the game controllers. Therefore, when the processor 113 determines that the usage status is changed to that the game controllers are mounted on the mobile phone, the processor 113 controls the switch 115 to disable the main device antennas A1-1 and A1-2 of the electronic device 100 and enable the accessory antenna A2-1.

Figure 11:
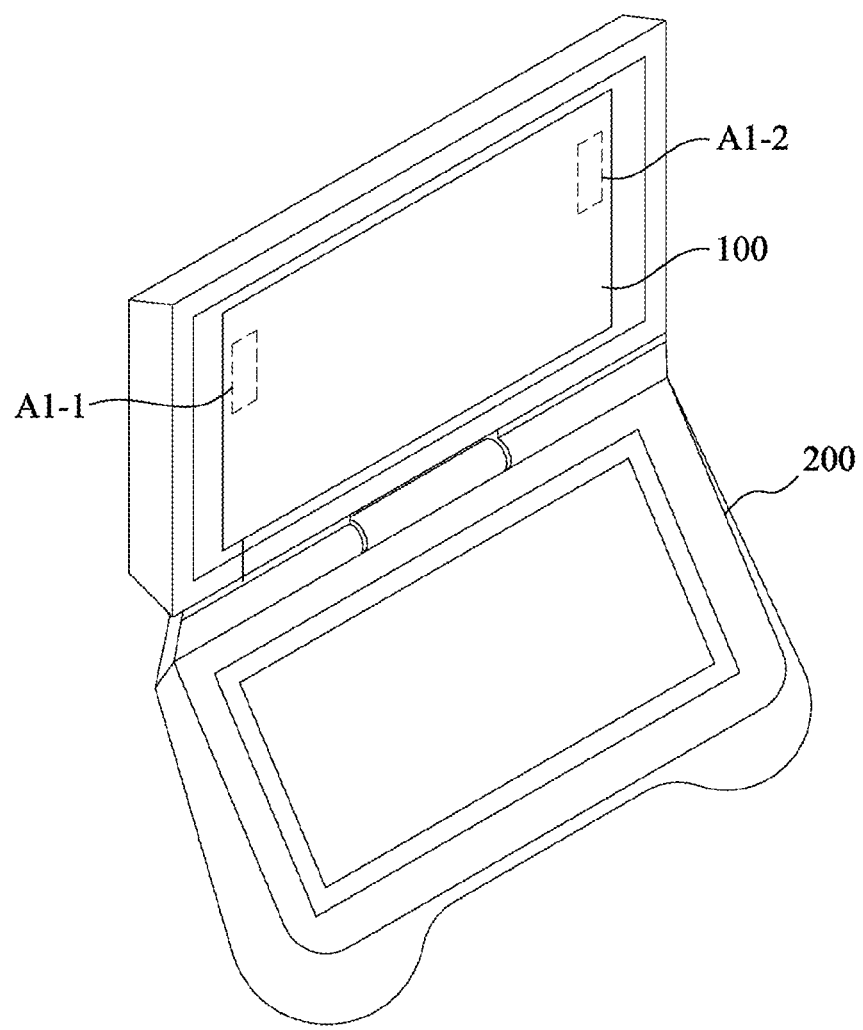
FIG. 11 shows an implementation scenario between an electronic device and an accessory device according to the invention.
Figure 12:
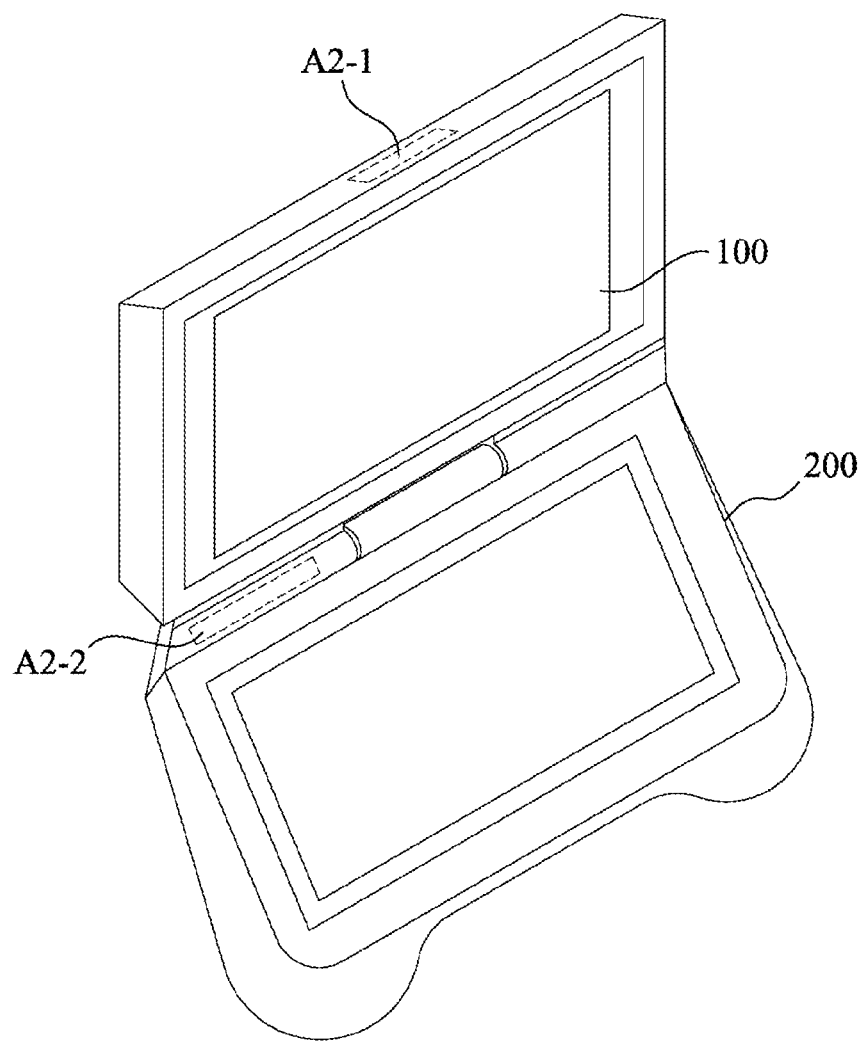
FIG. 12 shows an implementation scenario between an electronic device and an accessory device according to the invention.

Referring to FIG. 11 and FIG. 12, in an embodiment, the electronic device 100 is a mobile phone, and the accessory device 200 is a dual-screen base. Before the mobile phone is mounted on the dual-screen base, the switch 115 enables the main device antennas A1-1 and A1-2. When the mobile phone is mounted on the dual-screen base, signal strengths of the main device antennas A1-1 and A1-2 are affected by the dual-screen base and holding the dual-screen base by the user. Therefore, the processor 113 controls the switch 115 to disable the main device antennas A1-1 and A1-2 of the electronic device 100 and enable the accessory antennas A2-1 and A2-2.

In an embodiment, when the usage status has been changed, the processor 113 also controls the switch 115 to disable the currently used antennas and enable another main device antenna of the electronic device 100 and a second antenna of the accessory device 200.

In an embodiment, when the accessory device 200 is mounted on the electronic device 100 and the electronic device is simultaneously in other usage statuses (in an embodiment, enabling a camera, enabling Bluetooth, and the like), the processor 113 further switches the antennas to antennas with the best signal strengths in a plurality of usage statuses based on the enable data stored in the electronic device 100.

Based on the above, in an antenna switching mechanism of the invention, the usage status of the electronic device and the enable data are used as a pre-determination mechanism, to learn which antenna of a communication device has the best signal in a specific usage status and switch to the antenna with the best signal according to the enable data. In addition, the enable data of the invention includes a usage status sensed by the sensor, a usage status of a software application program, a usage status of enabling a hardware component, or the like. Therefore, in the invention, switching to the antenna with the best signal is performed according to changes of the usage statuses and the enable data, and interference sources are further avoided. In addition, used antennas corresponding to all usage statuses have been recorded in the enable data, so that a time period for switching the antennas is greatly shortened, and the energy is saved.

The foregoing embodiments are merely used to illustrate implementation aspects and technical features of the invention, and are not intended to limit the protection scope of the invention. Any modification or equivalent arrangements easily made by a person skilled in the art shall fall within the scope claimed in the invention. The protection scope of the invention shall be subject to the scope of the claims.

What is claimed is:

1. An electronic device, comprising:
a plurality of main device antennas;
a switch, configured to enable at least one of the main device antennas; and
a processor, electrically connected to the switch and configured to control the switch to switch the enabled main device antenna based on a usage status of the electronic device,
wherein when determining an accessory device comprising an accessory antenna is not mounted on the electronic device, the processor is configured to control the switch to enable the at least one of the main device antennas,
wherein when determining that the usage status is changed to that the accessory device is mounted on the electronic device, the processor is configured to control the switch to disable the at least one of the main device antennas and enable the accessory antenna.

2. The electronic device according to claim 1, wherein when determining that the usage status of the electronic device has been changed, the processor disables at least one main device antenna of the main device antennas and enables at least another main device antenna of the main device antennas, wherein a signal strength of the enabled main device antenna is greater than a signal strength of the disabled main device antenna.

3. The electronic device according to claim 1, further comprising a sensor electrically connected to the processor, and configured to sense the usage status of the electronic device, generate a sensing signal, and transmit the sensing signal to the processor, wherein the processor determines the usage status of the electronic device according to the sensing signal.

4. The electronic device according to claim 1, wherein the processor is further configured to run an operating system, and when an application program of the operating system is executed, the processor determines that the usage status of the electronic device has been changed and then controls the switch to switch the enabled main device antenna.

5. The electronic device according to claim 1, further comprising an antenna tuner, wherein the antenna tuner is electrically connected to the main device antennas and the processor, and the processor controls the antenna tuner to adjust an operating frequency band of a disabled main device antenna or an operating frequency band of the enabled main device antenna.

6. The electronic device according to claim 5, wherein the main device antennas are omnidirectional antennas or directional antennas.

7. The electronic device according to claim 1, further comprising a memory, wherein the memory is configured to store one piece of enable data, the processor is electrically connected to the memory, and the processor controls the switch to enable at least one of the main device antennas based on the usage status of the electronic device and the enable data.

8. The electronic device according to claim 1, wherein the accessory antennas are omnidirectional antennas or directional antennas.

* * * * *